(12) United States Patent
Kobayashi et al.

(10) Patent No.: US 11,174,819 B2
(45) Date of Patent: Nov. 16, 2021

(54) STARTING-FUEL SUPPLY DEVICE, ADAPTER, AND ENGINE WORK MACHINE

(71) Applicant: YAMABIKO CORPORATION, Tokyo (JP)

(72) Inventors: Yuta Kobayashi, Tokyo (JP); Takahiro Yamazaki, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 16/782,071

(22) Filed: Feb. 5, 2020

(65) Prior Publication Data

US 2020/0248651 A1 Aug. 6, 2020

(30) Foreign Application Priority Data

Feb. 6, 2019 (JP) .............................. JP2019-19482

(51) Int. Cl.
| | |
|---|---|
| *F02M 1/16* | (2006.01) |
| *F02M 17/04* | (2006.01) |
| *F02M 1/04* | (2006.01) |
| *F02M 1/06* | (2006.01) |
| *F02N 19/00* | (2010.01) |

(52) U.S. Cl.
CPC .............. *F02M 1/16* (2013.01); *F02M 1/04* (2013.01); *F02M 17/04* (2013.01); *F02M 1/043* (2013.01); *F02M 1/046* (2013.01); *F02M 1/06* (2013.01); *F02N 2019/002* (2013.01)

(58) Field of Classification Search
CPC .......... F02M 1/04; F02M 1/043; F02M 1/046; F02M 1/06; F02M 1/16; F02M 17/04; F02N 2019/002
See application file for complete search history.

(56) References Cited

U.S. PATENT DOCUMENTS

| | | | | |
|---|---|---|---|---|
| 6,101,991 A * | 8/2000 | Glover | ..................... | F02B 25/22 |
| | | | | 123/73 A |
| 7,694,943 B2 * | 4/2010 | Mason | ............. | F02M 35/10196 |
| | | | | 261/23.3 |
| 8,714,122 B2 * | 5/2014 | Yamazaki | ............... | F02B 25/22 |
| | | | | 123/73 AA |
| 9,127,588 B2 * | 9/2015 | Shirai | ..................... | F02B 25/18 |
| 9,422,890 B2 * | 8/2016 | Yamazaki | ............... | F02M 9/12 |
| 10,024,224 B2 * | 7/2018 | Yamazaki | ............... | F02B 25/22 |
| 10,060,392 B2 * | 8/2018 | Yamazaki | ............... | F02M 9/08 |

(Continued)

FOREIGN PATENT DOCUMENTS

| | | | | |
|---|---|---|---|---|
| JP | 58126452 A | * | 7/1983 | ............... F02M 1/04 |
| JP | H6-159146 A | | 6/1994 | |

(Continued)

*Primary Examiner* — Kevin R Steckbauer
(74) *Attorney, Agent, or Firm* — Hauptman Ham, LLP (57) ABSTRACT

Provided is a starting-fuel supply device, including: a starting-fuel supply valve configured to automatically add a starting fuel to an air-fuel mixture generated by a carburetor; and a valve chamber for the starting-fuel supply valve, wherein a fuel in a fuel tank is allowed to move to an intake passage through the valve chamber for the starting-fuel supply valve with use of a manual pump configured to suck up the fuel in the fuel tank into a carburetor before start of an engine, and wherein the valve chamber is disposed at a position below the intake passage when the engine is in a stored state.

2 Claims, 5 Drawing Sheets

(56) References Cited

U.S. PATENT DOCUMENTS

| | | | | |
|---|---|---|---|---|
| 2006/0090725 A1* | 5/2006 | Garvey | ............ | F02M 35/10137 |
| | | | | 123/198 E |
| 2007/0257379 A1* | 11/2007 | Mason | ..................... | F02M 7/00 |
| | | | | 261/44.6 |
| 2011/0079206 A1* | 4/2011 | Yamazaki | ............... | F02B 25/14 |
| | | | | 123/73 PP |
| 2012/0145137 A1* | 6/2012 | Shirai | ..................... | F02B 25/18 |
| | | | | 123/73 R |
| 2015/0102511 A1* | 4/2015 | Yamazaki | .............. | F02M 9/085 |
| | | | | 261/44.8 |
| 2015/0337765 A1* | 11/2015 | Yamazaki | .............. | F02M 19/08 |
| | | | | 123/73 A |
| 2016/0376979 A1* | 12/2016 | Osawa | .................. | F02B 25/02 |
| | | | | 123/73 A |
| 2017/0130642 A1* | 5/2017 | Yamazaki | ................ | F02B 75/02 |
| 2020/0248651 A1* | 8/2020 | Kobayashi | ............ | F02D 41/062 |

FOREIGN PATENT DOCUMENTS

| | | | | |
|---|---|---|---|---|
| JP | 2014098330 A | * | 5/2014 | .............. F02B 63/00 |
| WO | WO-2015012061 A1 | * | 1/2015 | ......... F02M 37/0011 |

* cited by examiner

STARTING-FUEL SUPPLY DEVICE, ADAPTER, AND ENGINE WORK MACHINE

CROSS REFERENCE TO RELATED APPLICATIONS

This application is based upon and claims the benefit of priority under from the prior Japanese Patent Application No. 2019-19482, filed on Feb. 6, 2019, the entire contents of which is hereby incorporated by references.

BACKGROUND

1. Field

This disclosure relates to a starting-fuel supply device configured to automatically supply a starting fuel to a carburetor at the time of start of an engine to enable smooth start of the engine. Further, this disclosure also relates to an adapter configured to form the starting-fuel supply device and to an engine work machine including the starting-fuel supply device.

2. Description of the Related Art

In Japanese Patent Application Laid-Open No. Hei 6-159146, there is described a starting-fuel supply device configured to automatically supply a starting fuel to a carburetor, which is configured to supply an air-fuel mixture containing a fuel and air to an engine, at the time of start of an engine to enable smooth start of the engine. The starting-fuel supply device couples a fuel chamber of the carburetor including a fuel pump and an intake passage to each other through a starting-fuel supply passage. A starting-fuel supply valve to be electrically opened and closed is provided in the starting-fuel supply passage. The starting-fuel supply valve is actuated based on an output signal of a primary coil of a flywheel magneto so as to start the engine by a recoil operation. Further, the starting-fuel supply device includes a manual pump, which is configured to charge a fuel in the fuel tank to the fuel chamber before the start of the engine, in a passage that connects the fuel chamber and a fuel tank to each other.

In the starting-fuel supply device, the fuel in the fuel tank is circulated through the fuel pump, the fuel chamber, the manual pump, and the fuel tank in the stated order by an operation of the manual pump before the start of the engine. When a worker performs the recoil operation so as to start the engine, the fuel in the fuel chamber is sucked into the intake passage owing to the Venturi effect in the intake passage. At the same time, the starting-fuel supply valve is automatically opened so that the fuel in the fuel chamber is sucked into the intake passage through the starting-fuel supply passage owing to the Venturi effect in the intake passage.

In the starting-fuel supply device, however, the starting-fuel supply valve may stick to a valve seat to make the actuation of the starting-fuel supply valve unreliable in some cases. In particular, when a stop period of a two-stroke internal combustion engine using a blended fuel of gasoline and oil becomes longer, an oil concentration of the blended fuel increases due to volatilization of gasoline while the engine is being stored. Thus, the oil may be present in a gap between the starting-fuel supply valve and the valve seat to adhere to both of the starting-fuel supply valve and the valve seat, and the sticking of the starting-fuel supply valve is liable to occur.

SUMMARY

This disclosure has been made in view of the circumstances described above, and has an object to provide a starting-fuel supply device, with which sticking of a starting-fuel supply valve can be prevented.

This disclosure has another object to provide an adapter configured to form the starting-fuel supply device.

Further, this disclosure has another object to provide an engine work machine including the starting-fuel supply device.

In order to solve the above-mentioned problem, according to one embodiment of this disclosure, there is provided a starting-fuel supply device, including: a starting-fuel supply valve configured to automatically add a starting fuel to an air-fuel mixture generated by a carburetor; and a valve chamber for the starting-fuel supply valve, wherein a fuel in a fuel tank is allowed to move to the carburetor through the valve chamber for the starting-fuel supply valve with use of a manual pump configured to suck up the fuel in the fuel tank into the carburetor before start of an engine, and wherein the valve chamber is disposed at a position below an intake passage of the carburetor when the engine is in a stored state.

According to one embodiment of this disclosure, by an operation of the manual pump before the start of the engine, the fuel in the fuel tank is moved to the carburetor through the valve chamber for the starting-fuel supply valve. The fuel, which has been moved into the valve chamber, comes into contact with the starting-fuel supply valve to lubricate the starting-fuel supply valve. As a result, the sticking of the starting-fuel supply valve is prevented before the start of the engine. Thus, the starting-fuel supply valve is reliably actuated at the time of start of the engine to improve startability of the engine. Further, the valve chamber for the starting-fuel supply valve is disposed at a position below the intake passage of the carburetor when the engine is in a stored state, and hence the fuel does not drop by its own weight. Thus, the fuel is less liable to leak from the valve chamber while the engine is being stored. Accordingly, the sticking of the starting-fuel supply valve is easily prevented. Further, the fuel is less liable to leak from the valve chamber while the engine is being stored, and the fuel is accumulated in the valve chamber before the fuel moves into the carburetor. Thus, the operation of the manual pump is less required at the time of next start of the engine. Accordingly, high operability at the start of the engine is attained.

According to one embodiment of this disclosure, the engine is a stratified scavenging engine, an internal space of a suction pipe disposed between a cylinder block and the carburetor is divided into an air passage and an air-fuel mixture passage, and the starting fuel is supplied to at least one of air passage and the air-fuel mixture passage.

In the above-mentioned embodiment, when the air-fuel mixture passage of the suction pipe is arranged on a lower side, specifically, below the air passage in the suction pipe, the starting fuel is less liable to flow into the air passage. Thus, characteristics of the stratified scavenging engine are not impaired. Further, when the air passage of the suction pipe is arranged on the lower side, specifically, below the air passage in the suction pipe, the starting fuel is supplied to the air passage. However, the starting fuel is used at the time of start of the engine, and thus even when the starting fuel flows into the air passage, less contributes to deterioration of exhaust gas components.

According to one embodiment of this disclosure, the starting-fuel supply valve is provided to an adapter and the valve chamber is formed in the adapter, the adapter being formed separately from the carburetor, the adapter is allowed to be disposed between a suction pipe configured to connect the carburetor to a cylinder block and the carburetor, and the adapter has a starting-fuel discharge passage, which brings the valve chamber and the intake passage of the carburetor into communication with each other when the starting-fuel supply valve is actuated to be opened.

According to the above-mentioned embodiment, when the adapter is disposed between an existing carburetor, which does not include the starting-fuel supply valve and the valve chamber, and the suction pipe, a starting-fuel supply function can be attained with direct use of the existing carburetor. Further, with the formation of the starting-fuel discharge passage in the adapter, the starting-fuel discharge passage can be shortened. Thus, the starting fuel can be fed with high responsiveness.

According to one embodiment of this disclosure, the suction pipe is formed of a bellows. According to the above-mentioned embodiment, when the adapter is disposed between the existing carburetor, which does not include the starting-fuel supply valve and the valve chamber, and the suction pipe, a dimension of the adapter can be absorbed owing to contractility of the suction pipe. Thus, increase in size of configurations from the carburetor to the cylinder block can be prevented.

According to one embodiment of this disclosure, the suction pipe and the adapter are integrally molded. In this case, the suction pipe and the adapter are integrally molded, and hence workability in assembly is improved.

According to one embodiment of this disclosure, there is provided an adapter configured to form the starting-fuel supply device, the adapter including an annular mounting portion allowed to be disposed between the suction pipe and the carburetor, the annular mounting portion is formed integrally with a portion having valve mounting portions configured to mount the starting-fuel supply valve and the valve chamber, and a starting-fuel discharge port communicating with the starting-fuel discharge passage is formed in an inner peripheral surface of the annular mounting portion.

With the adapter according to one embodiment of this disclosure, the adapter can be disposed between the existing carburetor and the suction pipe with use of the annular mounting portion. The starting-fuel supply function can easily be attained with direct use of the existing carburetor and the suction pipe. Thus, the adapter according to the embodiment of this disclosure is convenient. Specifically, the adapter has versatility.

According to one embodiment of this disclosure, an engine work machine includes one of the starting-fuel supply device and the adapter. With the engine work machine according to one embodiment of this disclosure, the same actions and effects as those described above are attained.

DESCRIPTION OF THE EMBODIMENTS

In the following, embodiments of this disclosure are described with reference to the accompanying drawings.

A starting-fuel supply device according to one embodiment of this disclosure forms a part of an intake system of an engine to be mounted mainly in a portable engine work machine. The starting-fuel supply device is used in combination with a carburetor configured to supply an air-fuel mixture to the engine. Examples of the engine work machine using the starting-fuel supply device according to this disclosure include a work machine including a small air-cooled two-stroke internal combustion engine mounted therein as a power source, such as a chain saw, a grass trimmer, a power cutter, a hedge trimmer, and a power blower.

Figure 1:
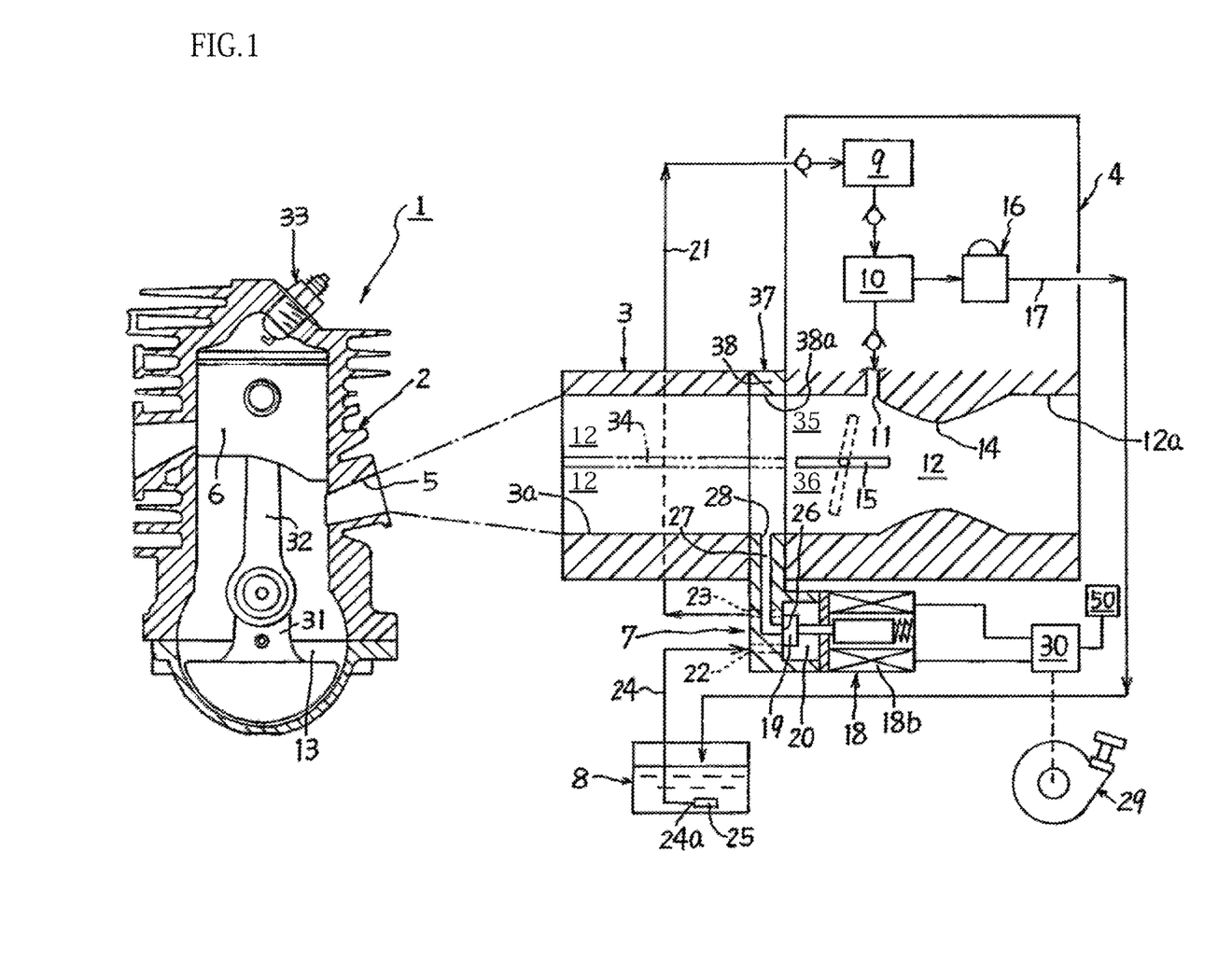
FIG. 1 is a schematic view of a fuel flow passage through a starting-fuel supply device according to one embodiment of this disclosure.

As illustrated in FIG. 1, a carburetor 4 is connected to a cylinder block 2 for forming an engine through a suction pipe 3 having a heat insulating property. An air purified in an air cleaner (not shown) is mixed with a fuel in the carburetor 4 to generate an air-fuel mixture. The air-fuel mixture is sucked into the cylinder block 2 through the suction pipe 3 and an intake port 5. The generation of the air-fuel mixture in the carburetor 4 and the suction of the air-fuel mixture into the cylinder block 2 are achieved by an operation of a piston 6 that reciprocally slides inside the cylinder block 2.

A type of the carburetor 4 to be used in combination with a starting-fuel supply device 7 according to this disclosure is not limited. However, as a carburetor suitable for a portable engine work machine in which a posture of a machine body is frequently changed during work, a diaphragm type carburetor having a well-known configuration itself is preferred. As illustrated in FIG. 1, the carburetor 4 includes a fuel pump 9, a fuel chamber 10, and a main fuel discharge port 11. The fuel pump 9 is connected to a fuel tank 8 of the engine work machine via a check valve. The fuel chamber 10 is connected to the fuel pump 9 via a check valve. The main fuel discharge port 11 is connected to the fuel chamber 10 via a check valve. The main fuel discharge port 11 is open to an intake passage 12 of the carburetor 4.

The fuel pump 9 is preferably a pulse-control diaphragm pump to be driven by a pressure pulse generated in a crankcase 13 of an engine 1. The fuel pump 9 sucks up the fuel from the fuel tank 8 to supply the fuel to the fuel chamber 10. The fuel in the fuel chamber 10 is sucked through the main fuel discharge port 11 into the intake passage 12 due to a pressure decrease in the intake passage 12, which is caused by a venturi 14. When a worker operates an output operation member (not shown) of the engine work machine, an opening degree of a throttle valve 15 in the intake passage 12 is adjusted. As a result, an engine output in accordance with the opening degree of the throttle valve 15 is obtained.

A manual pump 16 is also disposed in the carburetor 4. The manual pump 16 is configured to suck up the fuel in the fuel tank 8 into the fuel chamber 10 before start of the engine 1. The manual pump 16 is disposed in a return flow passage 17 extending from the fuel chamber 10 to the fuel tank 8. When the worker operates the manual pump 16 before the start of the engine 1, the fuel in the fuel tank 8 is supplied to the fuel chamber 10 to fill the fuel chamber 10 with the fuel. At the same time, a surplus fuel and a gas such as air bubbles in the fuel chamber 10 are forced into the fuel tank 8. The manual pump 16 may be provided integrally with the carburetor 4, or may be provided separately from the carburetor 4.

The starting-fuel supply device 7 according to this embodiment includes a starting-fuel supply valve 18 and a valve chamber 20. The starting-fuel supply valve 18 is configured to automatically add a starting fuel to the air-fuel mixture generated in the carburetor 4 or an air having passed through the carburetor 4. The valve chamber 20 accommodates a valve body 19 of the starting-fuel supply valve 18. The fuel in the fuel tank 8 can be moved to the carburetor 4 through the valve chamber 20 by the operation of the manual pump 16.

As illustrated in FIG. 1, in this embodiment, the valve chamber 20 is disposed in the middle of a suction flow passage 21 extending from the fuel tank 8 to the fuel pump 9 of the carburetor 4. Thus, when the fuel pump 9 is actuated, the fuel in the fuel tank 8 is moved into the fuel chamber 10 of the carburetor 4 through the valve chamber 20. Further, in this embodiment, the valve chamber 20 is disposed at a position below the intake passage 12 of the carburetor 4 when the engine work machine including the engine 1 is in a stored state. Each of a fuel inlet 22 and a fuel outlet 23 communicates with the valve chamber 20. The fuel inlet 22 communicates with the fuel tank 8 through a suction pipe 24, and the fuel outlet 23 communicates with the fuel pump 9 via the check valve. A suction-side end portion 24a of the suction pipe 24 is positioned in a lower part of an internal space of the fuel tank 8. A filter 25 configured to prevent suction of dust is provided to the suction-side end portion 24a.

An orifice (valve seat or flow passage hole) 26 is open to the valve chamber 20. The orifice 26 communicates with an air-fuel mixture passage 36 of the suction pipe 3 via a starting-fuel discharge passage 27 and a starting-fuel discharge port 28. When an air passage 35 of the suction pipe 3 is located on a lower side, specifically, below the air-fuel mixture passage 36, the orifice 26 may communicate with the air passage 35. The orifice 26 is always closed with the valve body 19 of the starting-fuel supply valve 18 except at the time of start of the engine. The starting-fuel supply valve 18 is actuated to be opened only at the time of start of the engine. As a result, the orifice 26 is opened. The starting-fuel discharge port 28 is open to the intake passage 12 on a downstream side with respect to the venturi 14.

The starting-fuel supply valve 18 can be electrically controlled. For example, a solenoid valve (electromagnetic valve) is used as the starting-fuel supply valve 18. As a power supply 50 for the starting-fuel supply valve 18, for example, a battery to be mounted in the engine work machine can be used.

Further, the actuation of the starting-fuel supply valve 18 can be controlled, as described in Japanese Patent Application Laid-Open No. Hei 6-159146, based on an output signal of a primary coil of a flywheel magneto which is rotated by operating a recoil starter 29 configured to start the engine 1. More specifically, when the worker operates the recoil starter 29, an electromagnetic coil 18b of the starting-fuel supply valve 18 is excited by a control circuit 30 based on the output signal of the primary coil of the flywheel magneto. As a result, the starting-fuel supply valve 18 is actuated to be opened. Then, when the engine 1 starts idling, the electromagnetic coil 18b of the starting-fuel supply valve 18 is demagnetized by the control circuit 30 based on the output signal of the primary coil of the flywheel magneto. As a result, the starting-fuel supply valve 18 is closed.

With the configuration described above, when the engine 1 is to be started, the worker first operates the manual pump 16 to supply the fuel in the fuel tank 8 to the fuel chamber 10. In this manner, the fuel in the fuel tank 8 is moved into the fuel pump 9 and the fuel chamber 10 through the valve chamber 20. As a result, the fuel chamber 10 is filled with the fuel. At the same time, a surplus fuel and a gas such as air bubbles in the fuel chamber 10 pass through the return flow passage 17 to be forced into the fuel tank 8. As a result, the engine 1 can be smoothly and reliably started.

Subsequently, after the worker turns on a start switch for the engine 1 and performs a pulling operation of the recoil starter 29, the piston 6 is reciprocated inside the cylinder block 2 through intermediation of a crankshaft 31 and a connecting rod 32. In synchronization with the reciprocation of the piston 6, ignition is performed by an ignition device 33. As a result of the reciprocation of the piston 6 inside the cylinder block 2, a negative pressure is generated in the intake passage 12 of the carburetor 4, and the fuel in the fuel chamber 10 is sucked into the intake passage 12 through the main fuel discharge port 11. As a result, the air-fuel mixture is generated. Simultaneously with the pulling operation of the recoil starter 29 performed by the worker, the starting-fuel supply valve 18 is actuated to be opened. Thus, the orifice 26 is opened, and the fuel in the valve chamber 20 passes through the starting-fuel discharge passage 27 to be discharged into the air-fuel mixture passage 36 of the suction pipe 3 due to the negative pressure in the intake passage 12. When the air passage of the suction pipe 3 is arranged on the lower side, specifically, below the air-fuel mixture passage 36 in the suction pipe 3, the fuel may be discharged to the air passage 35. As a result, the starting fuel is supplied to the air-fuel mixture or the air to thereby smoothly start the engine 1. When the engine 1 starts idling, the starting-fuel supply valve 18 is automatically closed by the control circuit 30.

In this embodiment, before the start of the engine 1, the fuel in the fuel tank 8 is moved into the fuel chamber 10 of the carburetor 4 through the valve chamber 20 by the operation of the manual pump 16. The fuel, which has been moved into the valve chamber 20, comes into contact with the valve body 19 of the starting-fuel supply valve 18 to lubricate the valve body 19. As a result, the sticking of the valve body 19 to the orifice 26 can be prevented before the start of the engine 1. Thus, the starting-fuel supply valve 18 is reliably actuated at the time of start of the engine 1, and the startability of the engine 1 is improved. Further, the valve chamber 20 for the starting-fuel supply valve 18 is disposed at the position below the intake passage 12 of the carburetor 4 when the engine 1 (engine work machine) is in a stored state. Thus, the starting-fuel supply device has such a configuration that the fuel does not drop by its own weight, and the fuel is less liable to leak from the valve chamber 20 while the engine is being stored. Accordingly, the sticking of the valve body 19 is easily prevented. Further, the fuel is less liable to leak from the valve chamber 20 while the engine is being stored, and the fuel is accumulated in the valve chamber before the fuel moves into the carburetor. Thus, the operation of the manual pump 16 is less required at the time of next start of the engine 1. Accordingly, high operability at the start of the engine is attained.

As a preferred embodiment, the engine 1 is a stratified scavenging engine. As indicated by imaginary lines in FIG. 1, an internal space of the suction pipe 3 disposed between the cylinder block 2 and the carburetor 4 is suitably divided by a partition 34 into the air passage 35 on the upper side and the air-fuel mixture passage 36 on the lower side so that the starting fuel is supplied to the air-fuel mixture passage 36. With the configuration described above, the starting fuel is less liable to move into the air passage 35. Thus, characteristics of the stratified scavenging engine are not impaired. Further, when the air passage 35 of the suction pipe 3 is arranged on the lower side, specifically, below the air-fuel mixture passage 36, the starting fuel is supplied to the air passage 35. However, the starting fuel is used at the time of start of the engine, and thus less contributes to deterioration of exhaust gas components.

Further, as a preferred embodiment, as illustrated in FIG. 1, there may also be adopted a configuration in which the starting-fuel supply valve 18 is provided to an adapter 37 and the valve chamber 20 is formed in the adapter 37. In this configuration, the adapter 37 is formed separately from the carburetor 4. In this case, the adapter 37 may be disposed between the suction pipe 3 configured to connect the carburetor 4 to the cylinder block 2 and the carburetor 4. The adapter 37 has the starting-fuel discharge passage 27 configured to bring the valve chamber 20 and the intake passage 12 (the air-fuel mixture passage 36 and the air passage 35) of the suction pipe 3 into communication with each other at the time of actuation of the starting-fuel supply valve 18 to open the starting-fuel supply valve 18. Further, as described above, in the case of the stratified scavenging engine, when the partition 34 is provided to the adapter, the partition 34 divides the intake passage 12 inside the adapter. Thus, the characteristics of the stratified scavenging engine are further improved.

Figure 2:
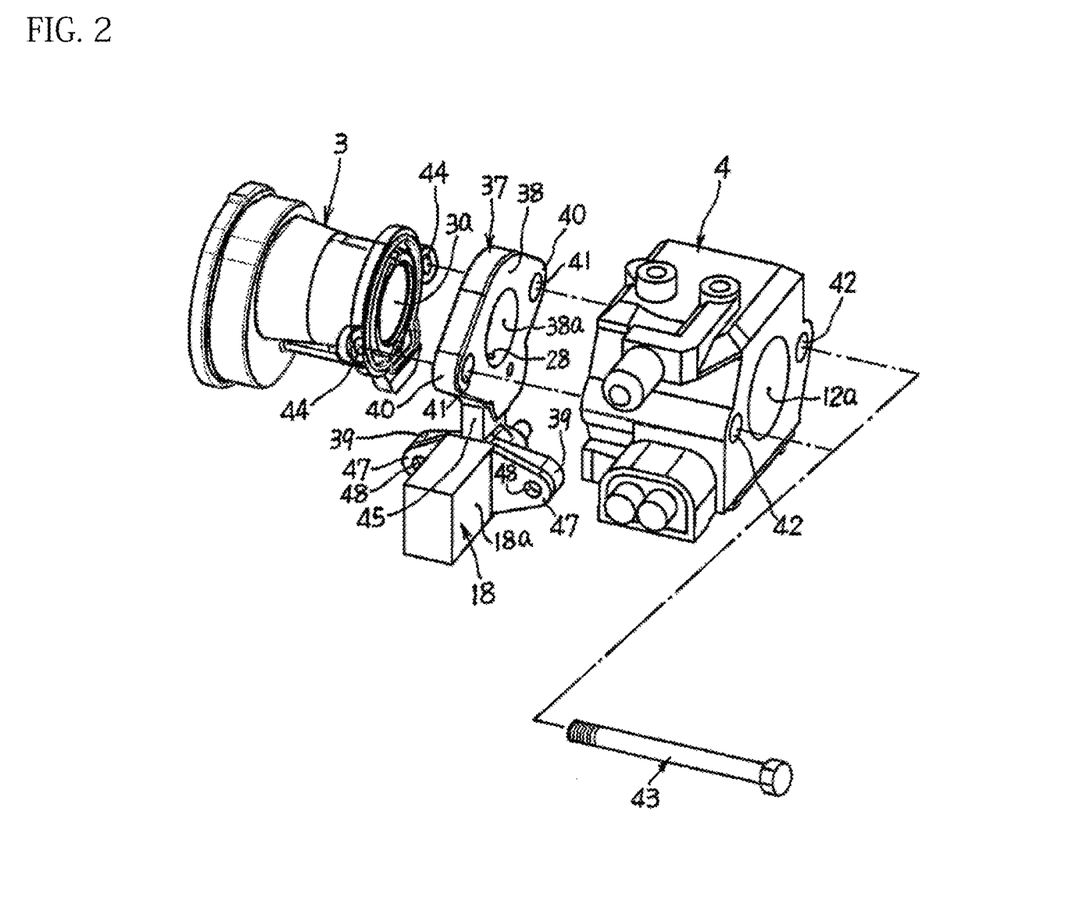
FIG. 2 is an exploded perspective view of an adapter provided with a starting-fuel supply valve, which forms the starting-fuel supply device according to the embodiment of this disclosure, a carburetor, and a suction pipe.

As illustrated in FIG. 1 and FIG. 2, the adapter 37 is disposed between the carburetor 4 and the suction pipe 3. The adapter of FIG. 2 is substantially the same as the adapter of FIG. 1. The adapter of FIG. 1 is schematically illustrated so that orientations of the starting-fuel supply valve 18 and the valve chamber 20 are changed by 90 degrees from those of FIG. 2 for easy understanding of the flow passage of the fuel.

As illustrated in FIG. 2, the adapter 37 includes an annular mounting portion 38, which can be disposed between the carburetor 4 and the suction pipe 3. Under a state in which the adapter 37 is disposed between the carburetor 4 and the suction pipe 3, an inner peripheral surface 38a of the annular mounting portion 38 is smoothly connected to an inner peripheral surface 12a of the intake passage 12 of the carburetor 4 and an inner peripheral surface 3a of the suction pipe 3 (see FIG. 1). The starting-fuel discharge port 28 is formed in the inner peripheral surface 38a of the annular mounting portion 38. Valve mounting portions 39, which are configured to mount the starting-fuel supply valve 18, and the valve chamber 20 (see FIG. 1) are formed integrally with the annular mounting portion 38.

The adapter of FIG. 2 has a pair of protruding portions 40, 40. The pair of protruding portions 40, which protrude radially outward, are formed at positions on the annular mounting portion 38, which are opposed to each other. A through hole 41 passing in an axial direction of the annular mounting portion 38 is formed in each of the protruding portions 40. The through holes 41, 41 respectively match with a pair of bolt insertion holes 42, 42 formed in the carburetor 4. Bolts 43 inserted into the bolt insertion holes 42 of the carburetor 4 respectively pass through the through holes 41 of the protruding portions 40 to be screwed into screw holes 44 of the suction pipe 3 to thereby couple the carburetor 4, the adapter 37, and the suction pipe 3.

Figure 3:
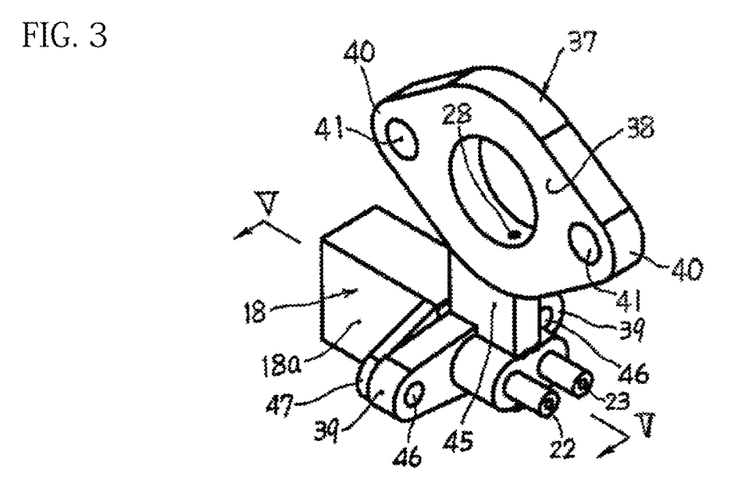
FIG. 3 is perspective view of the adapter in FIG. 2 when viewed in a direction different from that of FIG. 2.

As illustrated in FIG. 2 and FIG. 3, an extending portion 45 is formed so as to extend downward from a lower part of the annular mounting portion 38. At a lower end of the extending portion 45, a pair of protruding portions 39, 39 extending in directions opposite to each other are formed. The protruding portions 39, 39 serve as valve mounting portions. A through hole 46 for mounting the valve is formed in each of the protruding portions 39 (see FIG. 3). The pair of protruding portions 39, 39 respectively match with a pair of mounting portions 47, 47 formed on a valve case 18a for the starting-fuel supply valve 18. A through hole 48 is also formed in each of the mounting portions 47 formed on the valve case 18a. After the pair of protruding portions 39 and the pair of mounting portions 47 are placed so as to match with each other, bolts (not shown) are inserted through the through holes 46 and 48, which match with each other, to be fastened with nuts. As a result, the starting-fuel supply valve 18 is fixed to the adapter 37.

Figure 4A:
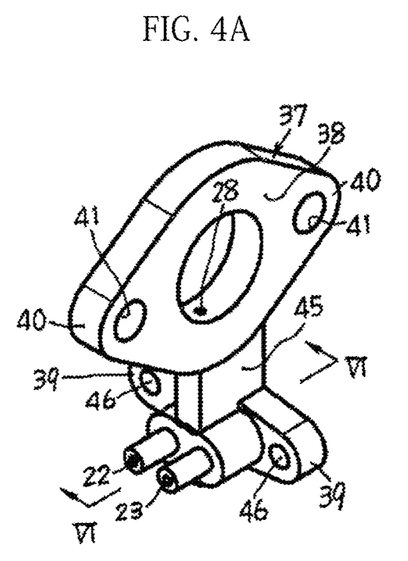
FIG. 4A and FIG. 4B are perspective views of the adapter in FIG. 3 when viewed in directions different from each other.
Figure 4B:
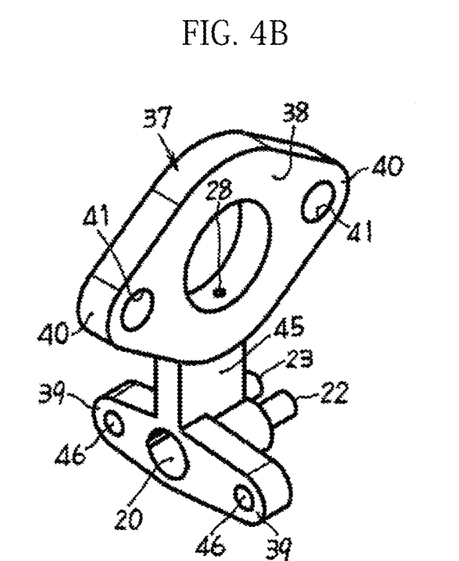
Figure 5:
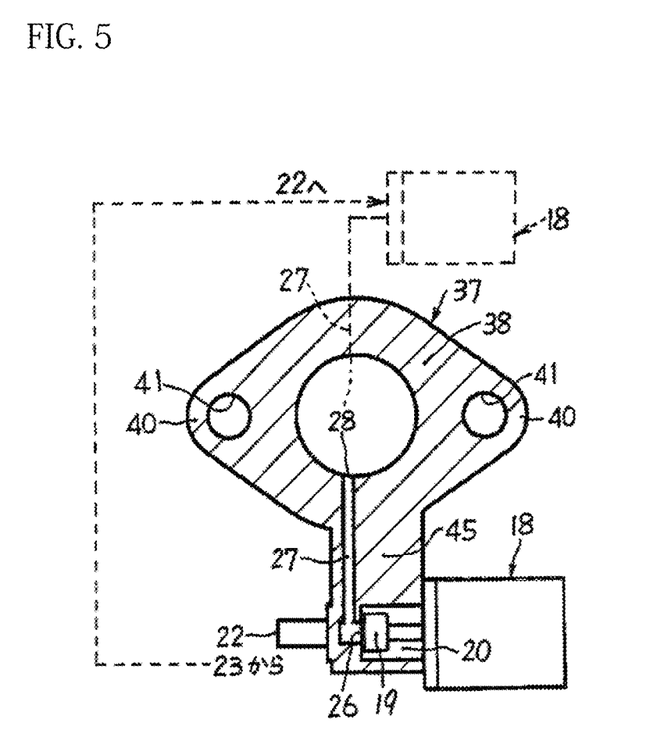
FIG. 5 is a sectional view taken along the line V-V of FIG. 3 when viewed in a direction indicated by arrows.
Figure 6:
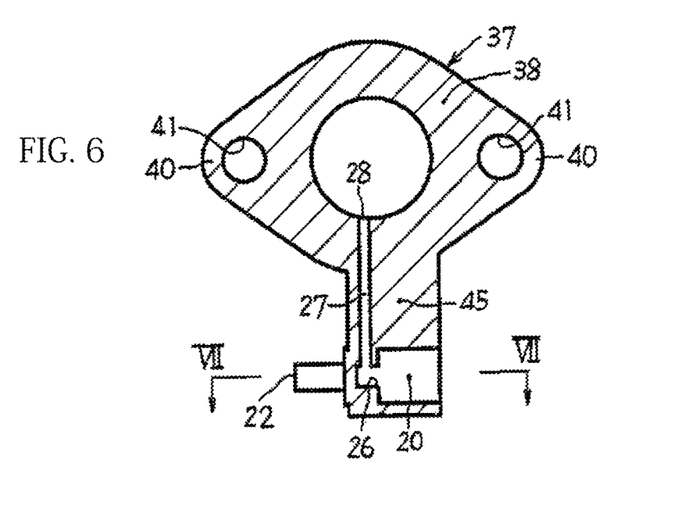
FIG. 6 is a sectional view taken along the line VI-VI of FIG. 4A when viewed in a direction indicated by arrows.
Figure 7:
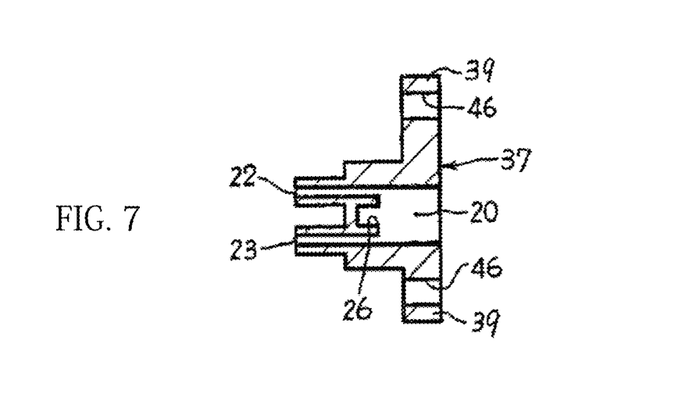
FIG. 7 is a sectional view taken along the line VII-VII of FIG. 6 when viewed in a direction indicated by arrows.

As illustrated in FIG. 4B, the valve chamber 20 having a recessed shape is formed between the pair of protruding portions 39, 39 serving as the valve mounting portions. As illustrated in FIG. 5 to FIG. 7, the orifice 26 is located at a position in the valve chamber 20, which is on the side opposite to an open side of the valve chamber 20. Then, as illustrated in FIG. 5, when the starting-fuel supply valve 18 is mounted to the adapter 37, the orifice 26 is closed with the valve body 19 of the starting-fuel supply valve 18 so that the valve chamber 20 has a closed space. As illustrated in FIG. 5 and FIG. 6, the orifice 26 communicates with the starting-fuel discharge port 28 via the starting-fuel discharge passage 27 formed in the extending portion 45. Thus, when the starting-fuel supply valve 18 is actuated to be opened, the valve chamber 20 comes into communication with the starting-fuel discharge port 28.

As illustrated in FIG. 4A, the fuel inlet 22 and the fuel outlet 23, each having a protruding-pipe shape, are formed at the lower end of the extending portion 45. The fuel inlet 22 and the fuel outlet 23 both communicate with the valve chamber 20, as illustrated in FIG. 7. As already described above, the fuel inlet 22 communicates with the fuel tank 8 through the suction pipe 24 (see FIG. 1), and the fuel outlet 23 communicates with the fuel pump 9 via the check valve.

With the configuration described above, when the adapter 37 is disposed between the existing carburetor 4, which does not include the starting-fuel supply valve 18 and the valve chamber 20, and the suction pipe 3, a starting-fuel supply function can be attained with direct use of the existing carburetor 4. Further, with the formation of the starting-fuel discharge passage 27 in the adapter 37, the starting-fuel discharge passage 27 can be shortened. Thus, the starting fuel can be fed with high responsiveness.

The suction pipe 3 is suitably formed of a contractile bellows as a preferred embodiment although the suction pipe 3 is not limited thereto. With use of the bellows for the suction pipe 3, when the annular mounting portion 38 of the adapter 37 is disposed between the existing carburetor 4, which does not include the starting-fuel supply valve 18 and the valve chamber 20, and the suction pipe 3, a thickness dimension of the annular mounting portion 38 can be absorbed owing to contractility of the suction pipe 3. Thus, increase in size of the configurations from the carburetor 4 to the cylinder block 2 can be prevented.

Further, as another preferred embodiment, the suction pipe 3 and the adapter 37 may also be integrally molded. In this manner, workability in assembly of the engine 1 is also improved. The suction pipe 3 and the adapter 37 can be integrally molded by, for example, injection molding of a resin, which is non-contractile unlike the bellows.

Further, as another preferred embodiment, a plurality of the starting-fuel supply valves 18 may be provided because the amount of fuel which can be supplied by the single starting-fuel supply valve 18 has a limit. For example, as indicated by the dotted line in FIG. 5, two starting-fuel supply valves 18 may be mounted so as to be arranged vertically. Alternatively, two starting-fuel supply valves 18 may be mounted on a lower side. In a case of the vertical arrangement of the two starting-fuel supply valves 18, at the time of start of the engine, the fuel is first fed from the fuel tank 8 to the starting-fuel supply valve 18 arranged on the lower side by the manual pump 16. After that, as indicated by the dotted-line arrow in FIG. 5, the fuel is fed through the fuel outlet 23 to another one of the starting-fuel supply valves 18. Then, the fuel is fed to the carburetor 4. Thus, the same sticking prevention effect as that described above is attained. Further, when two starting-fuel supply valves are provided, preferably, when two starting-fuel supply valves 18 are provided to the adapter 37, which is a separate member, the amount of starting fuel can be increased for an engine having a large output. At the same time, the same starting-fuel supply valves (electromagnetic valves) 18 can be adopted to improve versatility of the starting-fuel supply valves (electromagnetic valves) 18.

The embodiments of this disclosure have been described in detail with reference to the drawings. However, a specific configuration is not limited to those of the embodiments described above. For example, changes in design without departing from the scope of this disclosure are encompassed in this disclosure. Further, technologies in the above-mentioned embodiments described above may be used in combination as long as there is no particular contradiction or problem in, for example, purpose and configuration.

What is claimed is:

1. An engine work machine, comprising:
    an engine having a cylinder block as a power source;
    a carburetor;
    a suction pipe disposed between the cylinder block and the carburetor;
    a fuel tank;
    a manual pump configured to suck up fuel in the fuel tank into the carburetor before start of the engine;
    an adapter formed separately from the carburetor and disposed between the carburetor and the suction pipe; and
    a starting-fuel supply device,
    wherein
    the starting-fuel supply device includes
        a starting-fuel supply valve configured to automatically add a starting fuel to an air-fuel mixture generated by the carburetor; and
        a valve chamber in the starting-fuel supply valve, the valve chamber being upstream of a fuel chamber of the carburetor such that the fuel in the fuel tank is movable, by the manual pump, into the fuel chamber via the valve chamber,
    the valve chamber is disposed at a position below, in a direction toward a bottom of the fuel tank, at least one of
        an intake passage of the carburetor,
        an intake passage of the suction pipe, or
        an intake passage of the adapter,
    the engine comprises a stratified scavenging engine,
    an internal space of the suction pipe defines the intake passage of the suction pipe and is divided into an air passage and an air-fuel mixture passage,
    at least one of the air passage or the air-fuel mixture passage is configured to receive the starting fuel,
    a space below the intake passage of the carburetor, the intake passage of the suction pipe, or the intake passage of the adapter is free of any supply device other than the starting-fuel supply device,
    the engine work machine further includes a partition in the adapter, and
    the partition in the adapter divides the intake passage of the adapter and extends into the suction pipe to divide the internal space of the suction pipe into the air passage and the air-fuel mixture passage.

2. An engine work machine, comprising:
    an engine having a cylinder block as a power source;
    a carburetor;
    a suction pipe disposed between the cylinder block and the carburetor;
    a fuel tank;
    a manual pump configured to suck up fuel in the fuel tank into the carburetor before start of the engine;
    an adapter formed separately from the carburetor and disposed between the carburetor and the suction pipe; and
    a starting-fuel supply device,
    wherein
    the starting-fuel supply device includes
        a starting-fuel supply valve configured to automatically add a starting fuel to an air-fuel mixture generated by the carburetor; and
        a valve chamber in the starting-fuel supply valve, the valve chamber being upstream of a fuel chamber of the carburetor such that the fuel in the fuel tank is movable, by the manual pump, into the fuel chamber via the valve chamber,
    the valve chamber is disposed at a position below, in a direction toward a bottom of the fuel tank, at least one of
        an intake passage of the carburetor,
        an intake passage of the suction pipe, or
        an intake passage of the adapter,
    the engine comprises a stratified scavenging engine,
    an internal space of the suction pipe defines the intake passage of the suction pipe and is divided into an air passage and an air-fuel mixture passage,
    at least one of the air passage or the air-fuel mixture passage is configured to receive the starting fuel,
    a space below the intake passage of the carburetor, the intake passage of the suction pipe, or the intake passage of the adapter is free of any supply device other than the starting-fuel supply device,
    the starting-fuel supply valve is configured to supply the starting fuel to the air-fuel mixture passage,
    the engine work machine further includes a partition in the adapter, and
    the partition in the adapter divides the intake passage of the adapter and extends into the suction pipe to divide the internal space of the suction pipe into the air passage and the air-fuel mixture passage.

* * * * *